United States Patent [19]

Ewing et al.

[11] 4,261,932

[45] Apr. 14, 1981

[54] DIFFUSION ELEMENT WITH BOUNDARY ZONE TREATMENT

[75] Inventors: Lloyd Ewing, Bayside; David T. Redmon, Racine; William H. Roche, Mequon, all of Wis.

[73] Assignee: Water Pollution Control Corporation, Milwaukee, Wis.

[21] Appl. No.: 952,862

[22] Filed: Oct. 19, 1978

[51] Int. Cl.³ ............................. B01F 3/04; C02F 1/72
[52] U.S. Cl. .................................. 261/122; 239/34; 239/49; 239/145; 261/94; 261/124; 106/40 R
[58] Field of Search .................. 261/122, 124, 94; 239/34, 49, 57, 145; 106/40 R; 264/109, 112, 119, 120

[56] References Cited

U.S. PATENT DOCUMENTS

| | | | |
|---|---|---|---|
| 1,117,601 | 11/1914 | Porter | 261/122 |
| 1,223,033 | 4/1917 | Cole | 261/122 |
| 1,362,370 | 12/1920 | Terry, Jr. | 261/122 |
| 1,988,478 | 7/1932 | Broadwell | 261/122 |
| 3,103,254 | 9/1963 | Stedman | 264/109 |
| 3,768,788 | 10/1973 | Candel | 261/122 |
| 3,997,634 | 12/1976 | Downs | 261/122 |
| 4,046,845 | 9/1977 | Veeder | 261/122 |

*Primary Examiner*—Frank W. Lutter
*Assistant Examiner*—Gregory N. Clements
*Attorney, Agent, or Firm*—Pollock, Vande Sande & Priddy

[57] ABSTRACT

Gas diffusion elements, formed of a body of solid particles which have been shaped, pressed and rendered coherent by bonding or sintering in a compacted form having pores, and having an enhanced apparent volumetric compression ratio in a central zone and in a boundary zone thereof, are disclosed. Such elements have a generally horizontal portion including an upper gas discharge surface having a bubble release pressure in water, by a test disclosed herein, in the range of about 2 to about 20 inches of water. Among the preferred embodiments is an element whose gas discharge surface has the property that its coefficient of variation is not greater than about 0.25, based on the values of bubble release pressure at a plurality of points over said surface. Such elements may provide improved gas, e.g. oxygen, transfer efficiency, and therefore hold promise of improving the efficiency and economics of gas transfer processes, such as for instance treatment of sewage or other wastewater with air, oxygen and/or ozone.

65 Claims, 21 Drawing Figures

WITHOUT BOUNDARY ZONE

FIG.18

WITH BOUNDARY ZONE

DIFFUSION ELEMENT WITH BOUNDARY ZONE TREATMENT

BACKGROUND OF THE INVENTION

Porous gas diffusion elements have been used since the 1920's for bubbling air into sewage in the activated sludge process.

Such elements are formed of a body of solid particles which has been shaped, pressed and rendered coherent by bonding or sintering in a compacted form having pores. Such compacts have been manufactured in a variety of forms of plate or disc-like configuration and mounted in holders in or near the bottom of sewage treatment tanks. Air under pressure, from a plenum beneath the element, is forced upwardly through pores extending through the body of the element to its upper surface, from which the air is released in the form of bubbles whose fineness is controlled in part by the sizes of the pores at the upper surface. The air encounters some resistance in passing from beneath the element into the water, and it is widely known that this includes frictional losses resulting from passing the air through the fine pores of the element.

With the exception of occasional defective elements which are inevitably produced in most manufacturing processes, the manufacturers of diffusion elements have apparently assumed that the quantity of air released from their upper surfaces was distributed with reasonable uniformity across the entire surface of the element. Although highly detailed design and performance specifications are regularly applied to most components of sewage aeration systems, stringent distribution uniformity specifications have not been developed for diffusion elements. Also, a widely accepted test for uniformity of air distribution in a sewage aeration air diffusion element has been to merely make a visual examination of the bubble pattern emitted by the element while it is operating submerged in water. Moreover, persons skilled in the art have accepted this type of test for many years. They have done so despite the fact that it is quite difficult to visually ascertain whether a submerged diffusion element is distributing air uniformly, due to the disturbance created by discharge of bubbles into the water. Moreover, if accurate methods have existed heretofore by which one could compare the air outlet of different portions of the area of a diffusion element, such techniques have not been generally known and applied in commercial practice by persons active in the manufacture of sewage aeration diffusion elements and associated aeration systems. From this it might appear that there is little or no need for detailed or stringent specifications for the air flow distribution uniformity of diffusion elements for aeration.

A bubble release pressure test developed by the present applicants has made it possible to compare the relative ease with which different portions of the gas discharge surface of a diffusion element which discharge bubbles. Through the use of this test it has been found that the gas distribution properties of diffusion elements are not nearly as uniform as previously supposed. Although randomly disposed disuniformities of gas distribution have been observed, use of the bubble release pressure test referred to above has shown a trend for some diffusion elements to discharge a disproportionate amount of their total flow through certain zones. A larger quantity of flow through a given zone results in an increased rate, which tends to produce larger bubbles. Due to their reduced surface area per unit volume, larger bubbles tend toward reduced gas transfer efficiency, e.g. OTE, oxygen transfer efficiency. Thus, in a sewage aeration process, passing a disproportionate share of the total flow through the central and boundary portion of the diffusion element, while the outward or surrounding zone of the element is underused, produces excessively large bubbles and therefore reduced oxygen transfer efficiency.

The tendency to release a disproportionate share of the total flow through a central zone, for instance, may arise from a variety of causes. For instance, a diffusion element whose permeability is substantially uniform across its gas release surface may release an excessive proportion of gas in its central portion due to the design of associated components, such as, for example, the holder or mount for the diffusion element. The configuration of the holder or mount may concentrate flow through the center of the element. Also, diffusion elements are known which have been manufactured in such a manner as to provide lesser permeability, greater density or lesser height in a peripheral annular zone of relatively small proportions. For example, U.S. Pat. No. 4,046,845 to Richard K. Veeder discloses the concept of subjecting a relatively narrow annular zone of a diffusion element to sufficient extra pressing to prevent discharge of bubbles from said zone. Application of the above described bubble release pressure test to such elements has shown that the effects of the extra pressing extend a considerable distance into the element from the annular zone, thereby considerably affecting the air distribution through the element and providing substantial encouragement for disproportionate flow through the central and boundary zones of the element. The present invention is aimed at the correction of these difficulties.

SUMMARY OF THE INVENTION

The invention provides a rigid, monolithic, porous, gas diffusion element having an enhanced apparent volumetric compression ratio in permeable central and boundary portions thereof. The element is formed of a body of solid particles which has been shaped, pressed and rendered coherent by bonding or sintering in a compacted form having pores. As viewed in vertical cross section the element includes a generally horizontal portion having a specific permeability in the range of about 6 to about 200 SCFM at 2 inches of water gauge. The maximum horizontal dimension of the aforesaid portion is in a ratio of at least about 4 to 1 relative to the thickness of said portion. The said portion also includes an upper gas discharge surface, which is generally horizontal and which has a bubble release pressure in water in the range of about 2 to 20 inches of water. The central and boundary zones are beneath a portion of the upper gas discharge surface. Within these zones the solid particles have been pressed to a greater apparent volumetric compression ratio as compared to the material in an outward zone positioned between the central and boundary zones beneath the gas discharge surface. The diffusion element also includes a peripheral zone in which the element has a lesser permeability, a greater density or a lesser height than a portion of the aforementioned outward zone or of the gas discharge surface above it.

Among the inventions disclosed herein are diffusion elements in which the apparent volumetric compression ratio of the central zone has been enhanced by distributing the particles in the aforementioned body, prior to or during pressing, for providing a larger mass of particles per unit horizontal area in the central zone, as compared to the mass of particles per unit area in the outward zone. The particles may be distributed prior to or during pressing by providing a larger mass of particles per unit volume in the central zone. Moreover the larger mass per unit area of particles may be provided by performing the pressing in a die having a cavity and filling a central portion and a surrounding portion of the cavity with said particles to respectively greater and lesser depths.

In accordance with the invention, the enhanced apparent volumetric compression ratio may also be provided by effecting, during pressing, relatively larger and smaller ratios of thickness reduction in the central and outward zones respectively; and this is true whether the height of particles in that portion of the body of particles corresponding to the central zone, prior to or during pressing, is substantially the same or different, e.g. greater, than the height of the particles in that portion of the body corresponding to the outward zone. These larger and smaller percentages of thickness reduction can be effected by performing the pressing in a press having a ram and die cavity with spaced, opposed compression faces having respectively smaller and larger clearances in central and surrounding portions of the space between the faces, whether the smaller clearances are provided by a protuberance on the compression face of the die cavity or by other means.

Within the boundary zone the greater apparent volumetric compression ratio may be provided in a a variety of ways, including effecting, during pressing, relatively larger and smaller ratios of thickness reduction in the boundary zone and in the outward zone, respectively. Here again, a press having a ram and die cavity with spaced, opposed compression faces with relatively smaller and larger clearances corresponding to the positions of the boundary zone and the aforementioned outward zone may be used. The respectively smaller and larger clearances may be provided by protuberances on the compression face of the die cavity, on the compression face of the ram or by other means.

The invention may be embodied in a wide variety of forms including for example those having planar surfaces and those having a depression above or below the central zone and spaced inwardly from the periphery of the element. That is, the element may be provided with a central depression or depressions in its gas infusion surface, its gas discharge surface or both. However, the aforesaid depression(s) may or may not be coextensive with the central zone. The depth and area of the depression(s) may be varied as desired for enhancing the uniformity of gas distribution laterally across the horizontal gas discharge portion of the element, and the depth may vary in portions of, or throughout, the depression(s). There may be one or more areas within the outline of the depression(s) which are not depressed. Moreover the enhanced apparent volumetric compression ratio of the boundary zone discussed above, may be provided by forming a downward and outward slope in the upper gas discharge surface of the element above the boundary zone with a downward and outward slope at an angle of depression in the range of about 10° to about 80° relative to the horizontal.

According to a particularly preferred form of the invention, there is provided a gas diffusion element having the property of discharging gas in a substantially uniform manner throughout an upper gas discharge surface of the element, said surface having the property that its coefficient of variation is not greater than about 0.25, said coefficient of variation being based on the values of bubble release pressure measurements at at least about 5 equally spaced points along each of two mutually perpendicular reference lines extending across said surface and through the center thereof.

Many other possible variations of the invention which are also considered to be inventions in their own right are disclosed in conjunction with preferred and various other embodiments discussed below and/or shown in the accompanying drawings.

DEFINITIONS

Apparent Volumetric Compression Ratio

For purposes of the present invention the "apparent volumetric compression ratio" is used as a basis for comparison of two or more zones of an element formed from a body of solid particles which has been shaped, pressed, and rendered coherent by bonding or sintering in a compacted form having pores. As applied to a given zone, said ratio constitues the quotient obtained when the height of material prior to pressing is divided by the height of material after pressing within said zone. Although it is recognized that pressing may cause some lateral migration of material from one zone to another, with limited effects on the observed compression ratio, such migration can normally be ignored, hence the reference to the compression ratio as "apparent". If the height of material differs at different locations within a zone either prior to or subsequent to pressing, an average height is used which is weighted on the basis of area in plan view. The height of all material subjected to compression is considered part of the height prior to compression. Therefore, if an additional height of material is placed upon an original quantity of material which has already been compacted, such as by preliminary partial pressing or vibration compaction, the height of the added material is included in the computation; more specifically, in determining the quotient, the divisor is the fully compacted height of all the material and the dividend is the uncompacted height of both the original and additional material.

Specific Permeability

The term "specific permeability" describes the overall rate of passage of gas through a dry diffusion element, and for purposes of the present invention is expressed in standard cubic feet per minute per square foot of area per inch of thickness at a driving pressure of 2 inches in water gauge under standard conditions of temperature, pressure and relative humidity (20° C., 760 mm Hg. and 36%, respectively). The specific permeability is calculated from the equation $G=Q(t/A)$, wherein G equals specific permeability, Q equals flow in standard cubic feet per minute, t equals thickness of the element in inches and A equals the mean effective gas flow area through the element normal to the direction of flow. If the gas discharge surface of the diffuser overlies portions of the element which are of varying thickness, the average thickness is used, the thickness being weighted on the basis of area.

Bubble Release Pressure

The "bubble release pressure" is used to characterize resistance to discharge of air under water from a point or area of the gas discharge surface of a diffusion element. As applied to a given point of a given element, it constitutes the quasistatic pressure which must be applied to release a bubble from said point on the gas discharge surface. As applied to a given area of the active gas discharge surface area of a diffusion element, which given area may include all or a part of the active area, the bubble release pressure is the mean of the bubble release pressures observed at a statistically significant number of points distributed over said area in a random or uniform manner. For purposes of this disclosure the bubble release pressure is expressed in terms of inches of water gauge, after deduction of the hydrostatic head. The test may be conducted using the apparatus disclosed in FIG. 7 or any other apparatus capable of producing data similar to or convertible to an indication of bubble release pressure. The values of bubble release pressure set forth herein were determined on a "quasi-static" basis in that the test apparatus was adjusted to a sufficiently low rate of flow to release bubbles slowly enough, so that the bubble release pressure observed would be substantially that which would be obtained under static conditions.

Coefficient of Variation

For purposes of the present invention, the "coefficient of variation" is the quotient obtained from dividing the "standard deviation" by the "mean". The "standard deviation" represents the root mean square of the deviations from the mean of a stated number of bubble release pressure measurements. The "mean" is the arithmetic average of the aforesaid bubble release pressure measurements.

Central Zone

The "central zone" of a diffusion element in accordance with the invention constitutes a central portion of the volume of the diffusion element which lies beneath a central area constituting a stated percentage of the total active gas discharge area of the element, it being understood that the bounds of said volume may or may not coincide with the position or positions of the edges of certain depressions which may be applied to the surface(s) of the element in accordance with the present invention. The "central zone" applies to diffusion elements of varying outline in plan view, whether circular, oval, square, rectangular, polygonal, irregular or otherwise, and the above-mentioned central area has a similar outline to, and a common center with, the active gas discharge surface of the element. In general, the central area which establishes the bounds of the central zone may constitute up to about 80% of the total active gas discharge area, more preferably about 60% and still more preferably about 40%.

Outward Zone

The "outward zone" includes a substantial portion of the body of the diffusion element beneath the total active gas discharge surface other than the "central zone". As compared to the central zone the outward zone lies further outward from the center of the element than the central zone.

Center

The term "center" refers to the position centroid or geometric center of the active gas discharge surface or of the center of the element itself in plan view, whether the element is of regular or irregular shape.

Peripheral Zone

The "peripheral zone" constitutes a portion of the volume of the diffusion element at or along the edge of the active gas discharge surface of the element which normally constitutes the outermost edge or periphery of the element. The peripheral zone, whether annular or non-circular, is one in which the element has been treated by pressing, including a combination of pressing with other techniques, to develop a zone having lesser permeability (including no permeability), greater density or lesser height than all or a portion of the outward zone.

Boundary Zone

A ∓boundary zone" may be situated adjacent to and inwardly of a peripheral zone, and may be situated between the peripheral zone and the outward zone preferably adjacent the outer edge of the outward zone. It is a zone in which there is a progressive increase, continuous or stepwise, in the apparent volumetric compression ratio of the element in the direction of the peripheral zone, or towards a vertical surface which is near the periphery of the element, which surface may for example be a portion of the side of an element, which portion is inwardly of and in or adjacent to the peripheral zone.

Vertical

The term "vertical" includes truly vertical and near vertical, e.g. within about 20° of vertical.

VARIOUS PREFERRED AND OTHER EMBODIMENTS

In accordance with FIGS. 1-5, a known technique of forming diffusion elements employs a die 1 having a cylindrical cavity 2 defined in part by a compression face or bottom wall 3, and side walls 4 and 5. The die is filled with a loose mix of solid organic or inorganic particles with or without binder which can be pressed and rendered coherent. For instance, one may employ beads or granules of synthetic resin, such as polyethylene or polystyrene, glass beads, granules of inorganic materials such as metal particles, alumina, mullite, silica and others. Organic and inorganic binders may also be included in the mix. The mixes may be designed for developing coherency by pressing and sintering and/or bonding, such as for instance organic adhesive bonding, glass bonding, or ceramic bonding.

Figure 1:
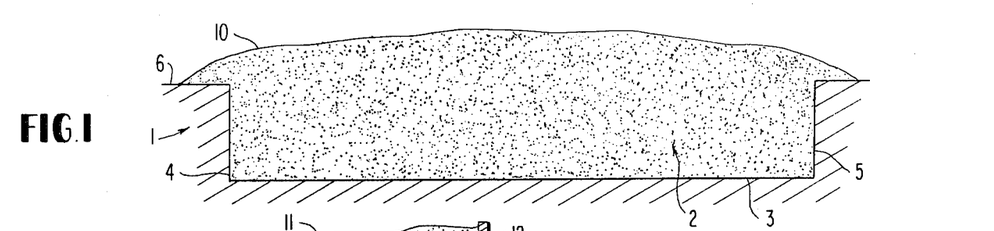
FIGS. 1 through 5 are fragmentary diagrammatic views in transverse, vertical cross-section, showing a prior art techniques for shaping and pressing a body of particles to form a gas diffusion element.
Figure 2:
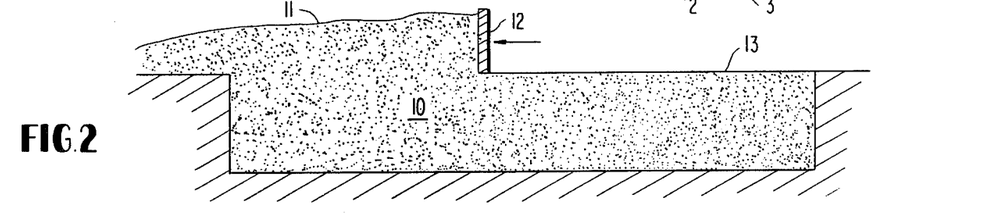

According to one known technique the die 1 is filled above its upper surface 6 with the body of loose particulate solid material 10. Then, as shown in FIG. 2, the excess material 11 is struck off with a screed 12 which is shown as having partially completed formation of a level surface 13 over the entire surface of the uncompacted body 10.

Figure 3:
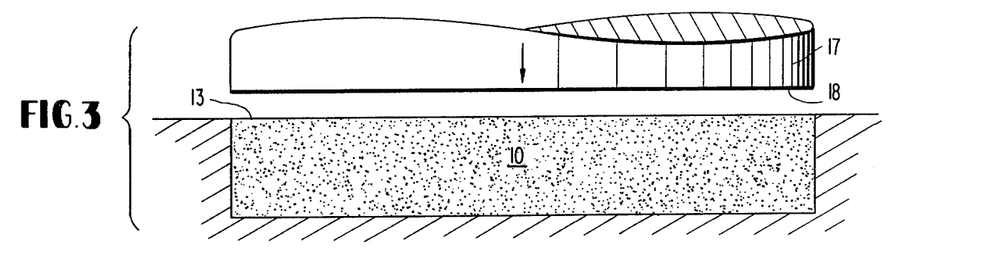
Figure 4:
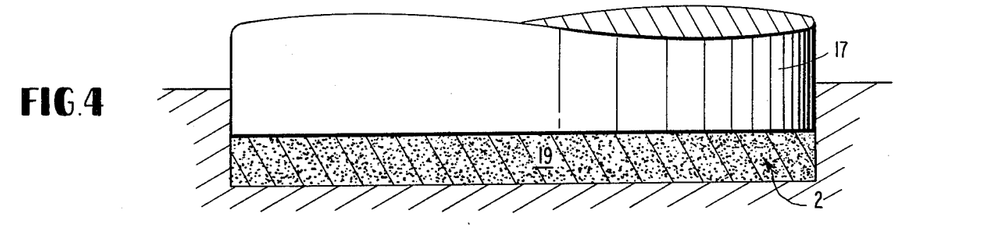
Figure 5:
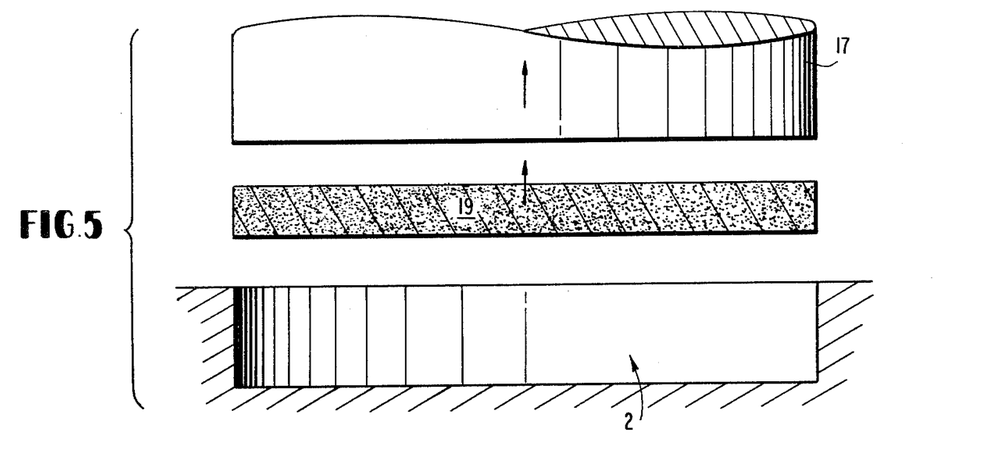

Next, as shown in FIG. 3, ram 17 having compression face 18 is moved toward surface 13 and eventually engages same. Further travel of ram 17 as shown in FIG. 4 presses the body 10 in die cavity 2, converting the body of particulate material to compacted form 19. Withdrawal of ram 17 as shown in FIG. 5 permits one to remove the compact 19 from die cavity 2. Depending on the mix used, the compact may or may not be baked or fired to produce the completed element.

Figure 6:
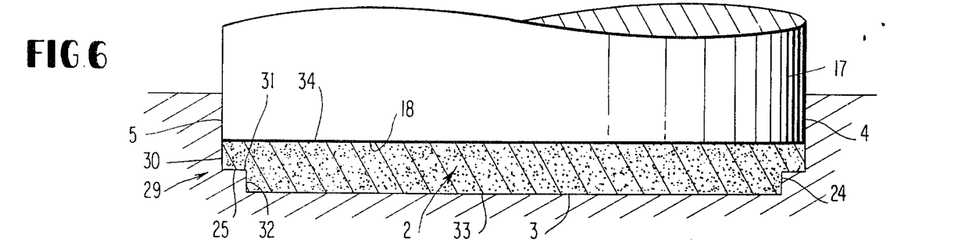
FIG. 6 is similar to FIG. 4, and illustrates a modification of the process of FIGS. 1 through 5.

By a modification of die cavity 2 shown in FIG. 6, it is possible to produce a diffusion element having an annular peripheral zone having greater density, lesser permeability and lesser height than the remainder of the element. In this connection, a step is formed in die cavity 2 between bottom wall 3 and side walls 4,5. This step includes a vertical cylindrical surface 24 and a horizontal annular surface 25. When one uses this die cavity with a ram 17 to perform the same sequence of operations described above in connection with FIGS. 1 through 5, one obtains a diffusion element having an annular peripheral zone as above described. FIG. 6 shows such element in a stage of production corresponding to FIG. 4. The resultant element includes an integral annular peripheral zone generally indicated by reference numeral 29, having a vertical cylindrical edge 30, horizontal annular surface 31 and vertical side surface 32, as well as gas infusion surface 34 and discharge surface 33. It will be noted that the surface 33 lies against die cavity bottom 3 during the pressing operation. While this surface has been denominated the gas discharge surface for purposes of discussion, it should be noted that surface 33 can also serve as the gas infusion surface, in which case surface 34 would become the gas discharge surface.

Figures 7, 7A, 7B:
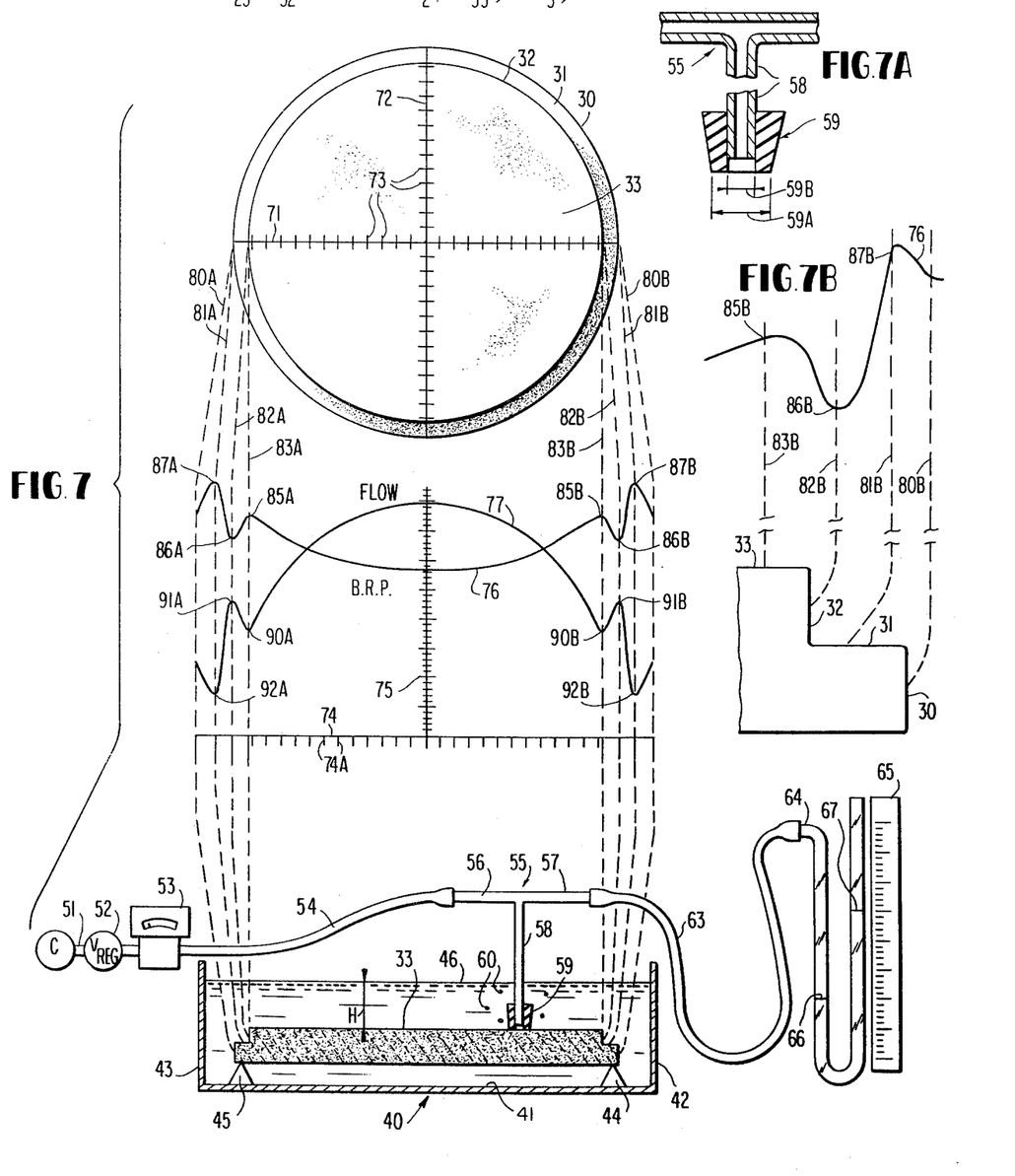
FIG. 7 is a diagrammatic illustration, partly in section, including a gas diffusion element as formed in FIG. 6, an apparatus for determining the bubble release pressure of the element and a graphical representation of the bubble release pressure and corresponding flow characteristics of the element.
FIG. 7A is an enlarged portion of the probe of FIG. 7.
FIG. 7B is an enlarged and foreshortened portion of the element and bubble release pressure curve of FIG. 7.

The element produced in FIG. 6 is shown in plan view in FIG. 7 wherein vertical cylindrical edge 30, horizontal annular surface 31, vertical side surface 32 and gas discharge surface 33 are visible. FIG. 7 illustrates the testing of this plate for bubble release pressure. One possible apparatus for performing such a test is shown in the lower portion of FIG. 7 and in FIG. 7A.

The exemplary apparatus includes a tank 40 (FIG. 7) having bottom wall 41 and side walls 42,43. Resting on bottom wall 41 are supports 44,45 which support the diffusion element with its gas discharge surface 33 facing upwardly beneath the water level 46. Compressor C is connected via conduit 51, pressure regulating valve 52 and flowmeter 53 with a first hose 54. The latter is in turn connected to the first horizontal leg 56 of a tee 55 having a second horizontal leg 57 and vertical leg 58. A sealing ring 59 is provided around the open bottom end of vertical leg 58. Second horizontal leg 57 is connected via second hose 63 with a monometer 64 having a scale 65. By comparison of liquid levels 66 and 67 with scale 65 it is possible to determine the pressure within the system, which is assembled carefully to provide gas tight joints at all connections between components.

As shown in greater detail in FIG. 7A, the vertical leg 58 of tee 55 and the sealing ring 59 constitute a test probe. It may for example be fabricated from a standard laboratory glass tee having a sufficient internal diameter to readily deliver the desired gas flow and from a standard rubber stopper assembled as shown, the bottom of the stopper constituting the end of the probe and having outside and inside diameters 59A and 59B of ⅜ inch and 3/16 inch, respectively. The probe can be manually pressed against the gas discharge surface 33 of the diffusion element with its inside diameter surrounding a test site and with the lower surface of sealing ring or stopper 59 forming a gas-tight seal, sealing off the surrounding surface from the test site and the interior of vertical leg 58 and the remainder of the attached pressure and flow producing and measuring components. Air flow under pressure from the probe enters surface 33, travels outwardly from the test site through the body of the element beneath the sealing ring and emerges as bubbles 60 through a pore or pores nearby. The pressure required to release the bubbles can be read from the manometer. Since the stopper 59 is non-adherent relative to surface 33, the probe may be readily moved from one test site to another to take a series of pressure readings from which bubble release pressure can be calculated.

Returning to FIG. 7, mutually perpendicular reference lines 71 and 72 are drawn on gas discharge surface 33 of the diffusion element. Equally spaced reference marks 73 situated along reference lines 71 and 72 identify test sites over which the open end of the above-described probe of FIG. 7A is sequentially positioned in such a way as to produce an effective seal as described above. Regulating valve 52 is adjusted against a relatively high pressure from compressor C to a relatively low rate of flow, i.e. $2 \times 10^{-3}$ C.F.M. When a bubble or bubbles 60 are produced through a portion of the gas discharge surface adjacent the probe, the pressure in the system is read from manometer scale 65. The bubble release pressure at the test point is obtained by subtracting the hydrostatic head H, between gas discharge surface 33 and water level 46, from the pressure read from the manometer. Taking bubble release pressure measurements at a statistically significant number of randomly or uniformly established points on gas discharge surface 33 enables one to determine the bubble release pressure of said surface. However, in actual practice it has been found to be reasonably accurate and convenient to establish all of the pressure testing points along two mutally perpendicular reference lines as shown. In a diffusion element manufactured with reasonable care, conducting the tests along two such reference lines provides a reasonably accurate approximation of the uniformity of distribution of air flow capabilities across the gas discharge surface.

The central portion of FIG. 7 includes a graph having a horizontal coordinate 74 with divisions 74A corresponding in scale and position to reference mark 73 on reference line 71. Vertical coordinate 75 of this graph includes an appropriate scale of pressure values 75 whereby the pressure readings taken at reference marks 73 on reference line 71 may be plotted between the coordinates to develop a bubble release pressure profile or curve 76. In a tank 40 with sufficient space between side walls 42,43 and the sides of the diffusion element, it is possible also to take bubble release pressure readings at the vertical cylindrical edge 30, horizontal annular surface 31 and vertical side surface 32 as well as at a point on gas discharge surface 33 which is quite close to the vertical side surface 32. The positions of the test sites on the diffusion element and the corresponding positions of the pressures as plotted in the graph are shown by dashed reference lines 80A,80B (vertical cylindrical edge 30), 81A,81B, (horizontal annular surface 31), 82A, 82B (vertical side surface 32) and 83A, 83B (edge of gas discharge surface 33). The aforementioned testing and plotting positions are shown in greater detail in FIG. 7B, an enlarged and foreshortened portion of FIG. 7.

The bubble release pressure is an indication of the pressure required for bubbles of air to overcome surface tension upon discharge from the pores of the plate. It has been found that this pressure requirement can considerably exceed the pressure losses due to friction in pushing the gas from the air infusion surface to the gas discharge surface of the plate. This is particularly true where the plate is fabricated of hydrophilic materials which are readily wetted by the water as compared to hydrophobic materials.

The graph in FIG. 7 shows that the plate produced in accordance with FIG. 6 exhibits minimum bubble release pressure (B.R.P.) in a central region of the element. In surrounding regions of the element, the bubble release pressure grows gradually higher, climbing towards a maximum 85A, 85B, indicated by reference lines 83A, 83B, based on tests made on gas discharge surface 33 adjacent vertical side surface 32. Bubble release pressure tests on side surface 32 indicated by reference line 82A, 82B indicate that the bubble release pressure reaches a second minimum 86A, 86B in this area. A further measurement of bubble release pressure on horizontal annular surface 31, indicated by dashed lines 81A, 81B shows that the pressure can reach a second maximum 87A, 87B in this area. A final observation taken on vertical cylindrical edge 30 as indicated by reference lines 80A, 80B indicates there can be some reduction of bubble release pressure in this area as compared to the second maximum 87A, 87B. Using data accumulated along reference line 72, it is also possible to develop a bubble release pressure curve (not shown) for the test sites along reference line 72.

The existence of a low bubble release pressure region in vertical side surface 32 as indicated by the second minimum 86A, 86B of bubble release pressure curve 76 is unexpected. Perhaps this phenomenon may be explained in retrospect by a theoretical consideration of the flow of particles within the die cavity (see FIG. 6). Inasmuch as the solid particles between ram compression face 18 and horizontal annular surface 25 are subjected to greater compression than the adjoining particles between ram surface 18 and die bottom wall 3, downward and inward force vectors may possibly develop in the material above surface 25 as some of the particles, under compression, migrate downwardly and inwardly in the compact. Vertical side surface 32 may be shielded somewhat from such vectors by the inner edge of horizontal annular surface 25, whereby the material along surface 32 is less compacted than that along surface 31, imparting respectively greater and lesser permeability to said surfaces.

Inasmuch as the rate of flow of gas through a given region of the diffusion element will be an inverse function of the bubble release pressure in said region, it is possible to develop a flow curve 77 which is considered representative of the flow profile of the plate across reference line 71. Actual flow data may be obtained for the central portion of the element by operating the element for timed intervals with an inverted graduated cylinder over the test sites. Estimated flows based on bubble release pressure may be derived for the edges of the element. Analysis of the resulting flow curve provides a practical indication of the uniformity of gas flow distribution across the element. As shown by gas flow curve 77, peak flow occurs in the central region of the diffusion element, tapering off to a first minimum 90A, 90B (corresponding to bubble release pressure maximum 85A, 85B) near the outer edge of gas discharge surface 33. There are also flow peaks 91A, 91B and second minima 92A, 92B corresponding inversely and respectively to bubble release pressure minima 86A, 86B and second maxima 87A, 87B. Thus the testing technique illustrated in FIG. 7 has provided a much clearer and more quantatively accurate indication of the flow profile of the diffusion element than has heretofore generally been available in the industry. Moreover it has made it possible to see that such diffusion elements may exhibit their maximum flow in central regions, while outward regions of the elements are underused. Excessive gas flow through the central region of the plate tends to produce excessively large bubbles, thereby impairing the oxygen transfer efficiency of the plate.

FIGS. 8 through 19 disclose various forms of diffusion elements configured in such a manner as to avoid the above described difficulty. The diffusion elements may be manufactured according to any convenient method. However FIGS. 8 through 16 disclose illustrative methods which may be used if desired. These methods are modifications of the technique disclosed in FIGS. 1 through 5.

Figure 8:
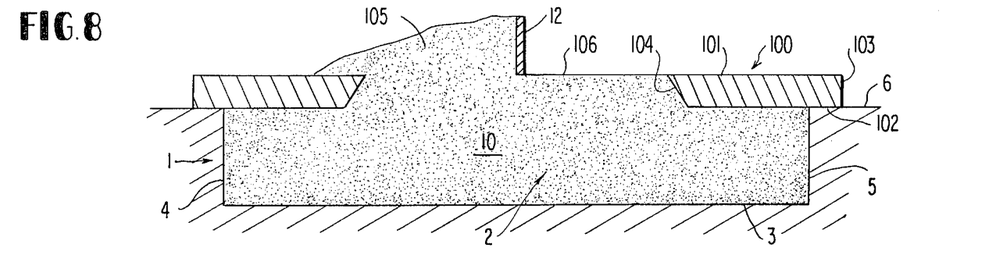
FIGS. 8 through 16 are fragmentary, diagrammatic, transverse sectional views disclosing diffusion elements in accordance with the present invention and illustrative methods for manufacturing same.
Figure 9:
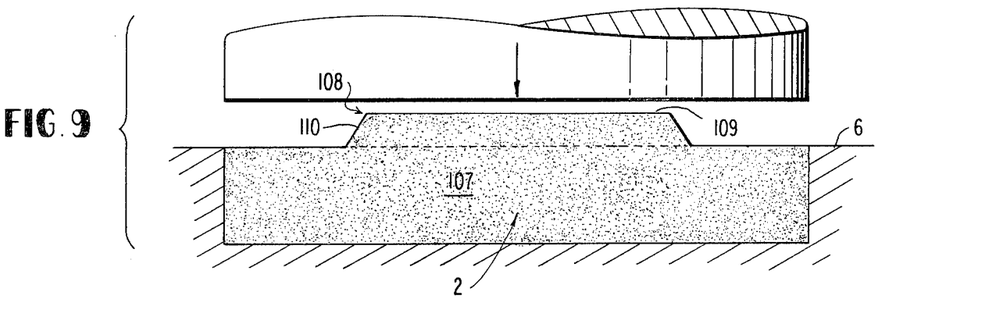
Figure 10:
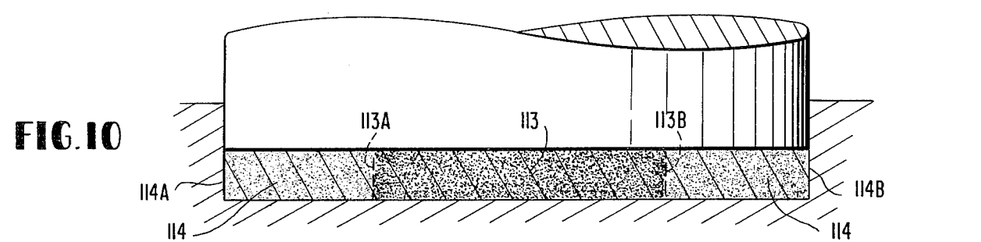

A first example shown in FIGS. 8 through 10, begins with filling and leveling off the contents of a die cavity as shown in FIGS. 1 and 2. After the level surface 13 (FIG. 2) has been prepared, a shaping ring 100 is placed on the die upper surface 6. Shaping ring 100 has planar upper and lower surfaces 101 and 102 and perpendicular peripheral surface 103 representing its outer edge. The ring also has an internal conical surface 104 defining a central frustro-conical chamber open at the top and bottom. The aforesaid chamber is initially empty because the body of particulate material has previously been screeded off flush to the die upper surface 6. However the chamber within internal conical surface 104 is now filled with excess particulate material 105 which is then struck off with screed 12 to a level surface 106 flush with upper surface 101 of shaping ring 100. Upon careful removal of shaping ring 100, there is left in die cavity 2 a body 107 of particulate material having an elevated central portion 108 with a flat top 109 and conical sides 110; however portion 108 can have various shapes.

Body 107 and the above described technique of preparing same constitute one example of providing a larger mass of particles per unit of horizontal area in a central zone or region, as compared to the mass of particles per unit area in an outward surrounding zone or region. In this case, the larger mass of particles per unit of horizontal area is provided by filling a portion of the die to a greater depth than the surrounding portions.

However, a larger mass of particles per unit area can also be provided by filling a central portion of the die with particles at a greater density. For instance, one may proceed in accordance with FIGS. 1 and 2 and then densify the particles in a central region of the die by localized vibration or pressing, which will cause the material in such region to sink lower in the die than the surrounding material. The resulting depression can be filled with additional particulate material prior to pressing or final pressing as the case may be. This is an illustration of distributing the particles prior to or during pressing for providing a larger mass of particles per unit volume in a central region or zone as compared to the mass of particles per unit volume in an outward or surrounding region or zone.

Irrespective of whether the central region or zone of the die is filled to a greater height and/or greater density the body of material is then pressed as shown in FIG. 10. This produces an element having an enhanced apparent volumetric compression ratio in its central zone 113 (bounded by reference lines 113A, 113B) as compared to the volumetric compression ratio in an outward zone 114, which in this case is an annular zone bounded at its inner edges by reference lines 113A, 113B and by the peripheral edges of the element indicated by 114A, 114B.

FIGS. 11 through 16 illustrate the preferred technique of providing enhanced apparent volumetric compression ratio. More specifically these figures disclose the technique of effecting, during pressing, relatively larger and smaller ratios of thickness reduction in the aforementioned central and outward or peripheral and boundary zones, respectively.

Figure 11:
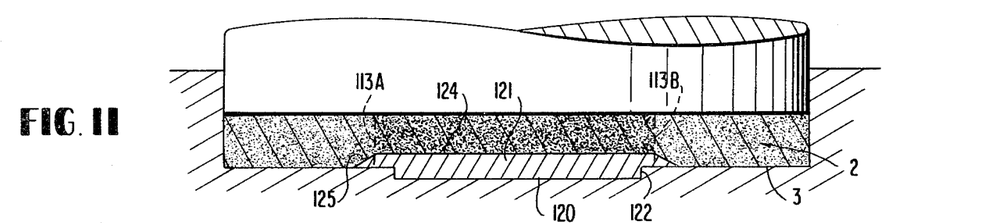
Figure 12:
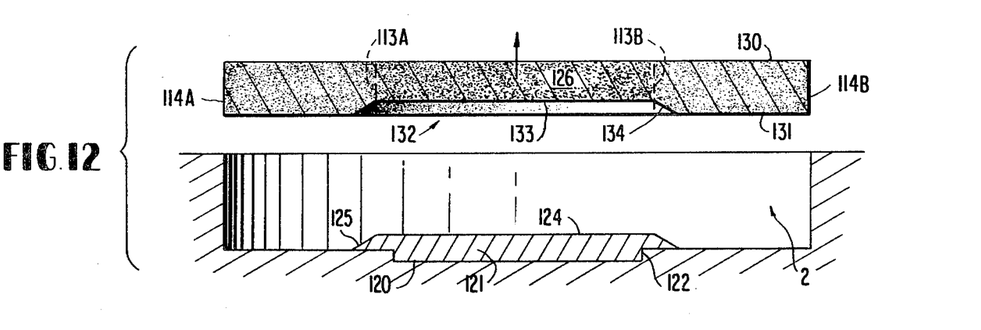

According to one of the preferred techniques disclosed in FIGS. 11 and 12, the relatively larger and smaller ratios of thickness reduction are obtained with the assistance of an annular insert 121 constituting a protuberance on the compression face 3 of die cavity 2. Insert 121 includes a lower cylindrical projection 122 which mates with a corresponding socket 120 in die cavity lower wall 3. The upper portion of insert 121 is a shaping member which includes a flat top 124 surrounded by a conical surface 125. One may carry out the procedure of FIGS. 1 through 5 except that the annular insert 121 is present as shown in FIG. 11 during formation of the compact. The resultant compact 126 shown in FIG. 12 after removal from die cavity 2 includes a planar air infusion surface 130 and a generally horizontal air discharge surface 131 including a central depression 132 having a flat area 133 and a beveled edge 134. This is an example of enhancing the apparent volumetric compression ratio of the central zone of a diffusion element by effecting, during pressing, relatively larger and smaller ratios of thickness reduction in the central and outward zones, respectively. In this case, the respective larger and smaller percentages of thickness reduction have been effected by performing the pressing in a press having a ram and die cavity with spaced, opposed compression faces with respectively larger and smaller clearances in central and surrounding portions of the space between the faces. In this case, the smaller clearance is provided by a protuberance, i.e. insert 121, on the compression face of the die cavity; but it is also possible to carry out this technique using a die cavity with a flat bottom wall and a protuberance on the compression face of the ram.

One can make a wide variety of modifications to the article and manufacturing technique shown in FIGS. 11 and 12 without departing from the invention. The shape, depth and area of the depression 132 may be freely varied to obtain the desired level of uniformity of air distribution at the gas discharge surface 131 of the element. The shape of the depression may include any desired outline which contributes to uniform distribution of air flow; but preferably the outline of the depression is similar to the outline of the element. Within the outline of the depression, there may be a wide variety of shapes as viewed in transverse cross section. The floor of the depression may be composed wholly of straight or curved surfaces or a combination of straight or curved surfaces. The center of the depression may be flat as shown, or gently curved throughout or may be in the form of an extremely flat cone or may have any other convenient or desirable shape which accomplishes the purposes of the invention. The showings of depressions including flat areas and beveled edges shown in the drawings herein are simple and preferred but are by no means intended to limit the invention.

As indicated above, the area of the central depression is not necessarily coextensive with the area which establishes the central zone of the element. The depression may terminate within or extend beyond the area which defines the central zone. However, it is convenient for purposes of design to establish the area of the depression in such a way that it is coincident with the area which defines the central zone of the element.

One may select any combination of area and average depth for the depression which are sufficient for significantly enhancing the uniformity of gas distribution laterally across the gas discharge portion of the element. For example, the area of the depression may comprise about 10 to about 80 percent, preferably about 25 to about 75 percent and more preferably 45 to about 65 percent of the total area of the element gas discharge surface or of the total area of the element, while the average depth of the depression may be about 2 to about 20 percent, preferably about 4 to about 15 percent and more preferably about 5 to about 10 percent of the average thickness of the horizontal portion of the element.

The depth of the element may vary within its outline, in either a stepwise or gradual fashion, the latter being preferred. Most preferably the variation occurs gradually along gradually sloping portions of the gas discharge surface. It is also contemplated that there may be certain areas within the outline of the depression in which there is no depression. Such is illustrated by FIG. 13.

Figure 13:
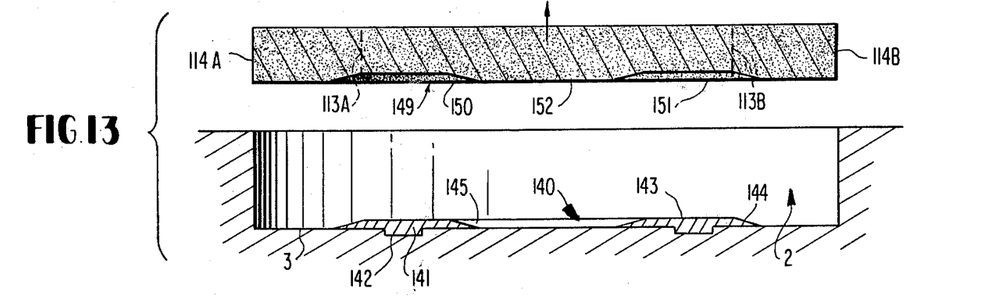

FIG. 13 discloses an element which can be formed for example, by a modification of the technique shown in FIG. 12. The insert 121 is replaced by an annular insert 140 having an annular rib 141 in its underside which engages a correspondingly shaped annular channel 142 in the bottom wall 3 of die cavity 2. Annular insert 140 includes a flat top 143 with beveled inner and outer edges 144, 145. When the thus modified die cavity 2 is employed to produce a part following the technique of FIGS. 1 through 5, the resultant piece, shown in the upper portion of FIG. 13, includes a central depression 149 of annular shape, having tapered edges 150, 151 and including a non-depressed center portion 152. Within the body of the circular element thus formed is a circular central zone whose boundaries are indicated by 113A, 113B, surrounded by an outward zone extending from 113A, 113B to the cylindrical peripheral surface of the element indicated by 114A, 114B.

Figure 14:
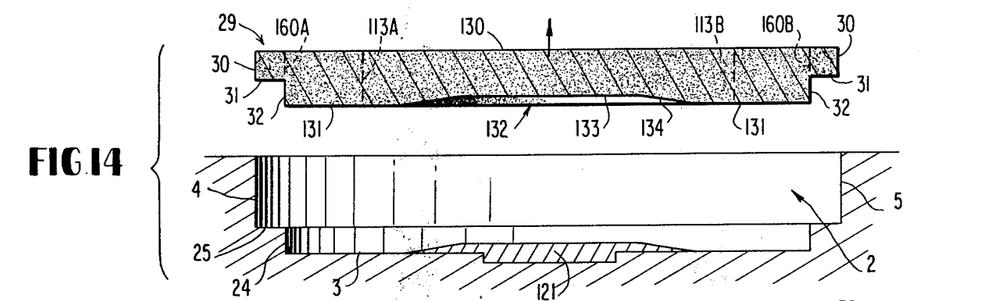

As illustrated in FIG. 14 the outward zone of the element does not extend to its extreme peripheral edge. FIG. 14 illustrates an element, and an illustrative method of production thereof, combining the features of previously described FIGS. 6, 11 and 12. The cylindrical die cavity 2 includes a circular insert 121 in its bottom wall 3. A step is formed about the periphery of bottom wall 3 where it joins side walls 4 and 5, said step including vertical cylindrical surface 24 and horizontal annular surface 25 as in FIG. 6. Production of an element with such a die following the sequence of operations disclosed in FIGS. 1 through 5 produces an element as illustrated in the upper portion of FIG. 14. This element includes a gas discharge surface 131 having depression 132 with tapered edges 134 within the bounds 113A, 113B of the central zone of the element. The vertical cylindrical surface 24 and horizontal annular surface 25 of the die cause the extreme peripheral portion of the element to include a vertical cylindrical edge 30, horizontal surface 31 and vertical side surface 32 defining a step in the edge of the element. That portion of the volume of the element bounded by planar air infusion surface 130, vertical cylindrical edge 30, horizontal annular surface 31 and reference lines 160A, 160B define an annular peripheral zone of reduced permeability, greater density and lesser average height as compared to the permeability, density and average height of the relatively inward and adjoining portions of the element. In this element the outward zone is bounded inwardly by reference lines 113A, 113B and at its outer edge by reference lines 160A, 160B.

FIG. 14 represents a way of improving the uniformity of air distribution of a porous gas diffusion element such as for instance that shown in FIG. 6. Formation of an annular zone of lesser height or greater density or lesser permeability affects not only the flow characteristics of the peripheral zone itself, but also the characteristics of the relatively inward portions of the element, tending to concentrate flow in a central zone. By providing an enhanced apparent volumetric compression ratio in the central zone, the foregoing tendency can be countered, equalized or eliminated.

Figure 15:
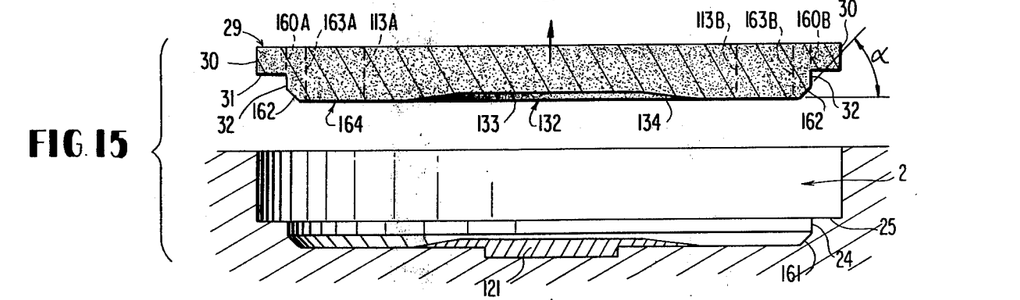

FIG. 15 illustrates how the present diffusion element includes a boundary zone adjacent to a peripheral zone. From the description of the element without a depression in FIG. 6 and the testing thereof as illustrated in FIG. 7, it will be recalled that the vertical side surface 32 of said element tended to exhibit a second minimum 86A, 86B of bubble release pressure and a corresponding peak 91A, 91B on the flow rate curve 77, indicated by dashed lines 82A, 82B. The tendency for the flow to peak in this area of the element may be considered undesirable depending on a number of factors such as for instance the type of holder and sealing arrangement adopted in mounting the element in a diffusion system. Where the element is mounted in such a manner that it is free to discharge bubbles through vertical side surface 32 into the medium to be aerated, there is a tendency for the surface to produce undesirably large bubbles and high flux rate. Moreover, if the surface 32 discharges into a crevice which can be swept clear of water (and thereby freed of surface tension) by the bubbles emanating from the pores in surface 32, a disproportionate share of the total air flow will be shifted to said surface. This tendency may be countered, equalized or overcome by a variety or combination of techniques including, for example, covering the surface 32 with an impermeable layer which is held or adhered in place, by utilization of seals and diffusion element holders of proper design, by the modification shown in FIG. 15, by a combination of these measures or by any other desired means.

FIG. 15 illustrates a diffusion element which includes a boundary zone adjacent to and inwardly of the peripheral zone, the solid particles having been pressed to a greater apparent volumetric compression ratio in the boundary zone as compared to the aforementioned outward zone. This is accomplished for instance by modifying the die cavity 2 to include a fillet 161 at the base of, and extending inwardly of, the step formed by vertical cylindrical surface 24 and horizontal annular surface 25. This fillet may for instance be at an angle relative to the horizontal, or relative to the surface of the the aforementioned outward zone (especially if the latter is not perfectly horizontal), in the range of about 10° to 70°. In other respects the die of FIG. 15 is identical to that shown in FIG. 14. When an element is pressed in the die of FIG. 15 following the techniques of FIGS. 1 through 5, the resultant element shown in the upper portion of FIG. 15 includes a beveled edge 162 which is at an angle alpha relative to the horizontal. For the style of plate shown in FIG. 15, 25° is considered the optimum value of alpha.

The benefits of providing the beveled edge 162 were not foreseen when the concept of central volumetric compression ratio enhancement was developed. However experience gained from working with the central depression concept and the above described measuring technique has led to some hypothetical explanations for the possible effects of beveled edge 162. It is theorized that the fillet 161 in the die exerts a crowding effect on the material above it, creating next to the outward zone a ring-like boundary zone bounded at its outer edges by reference lines 160A, 160B adjacent annular peripheral zone 29 and bounded at its inner edge by reference lines 163A, 163B. The FIG. 15 is one example in which larger and smaller percentages of thickness reduction have been effected by performing the pressing in a press having a ram and die cavity with spaced, opposed, compression faces and wherein there are relatively smaller and larger clearances in those portions of the space between the faces which correspond to the positions of the boundary zone and the aforementioned outward zone in the diffusion element. In this particular instance, the smaller clearance is provided by a protuberance on the compression face of the die cavity, i.e. fillet 161.

Figure 16:
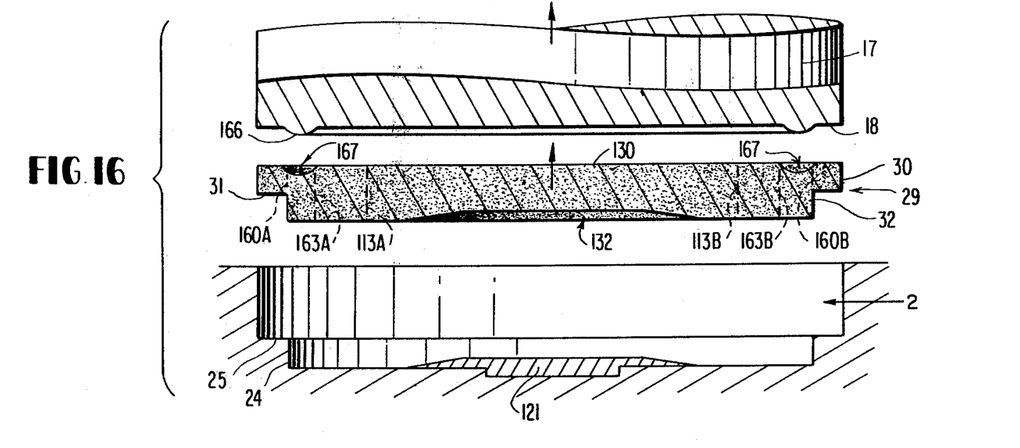

FIG. 16 discloses an alternative technique for providing the larger and smaller percentages of thickness reduction referred to above. More specifically, in FIG. 16 the smaller clearance is provided by a protuberance on the compression face of the ram. For example, as shown in FIG. 16 the compression face 18 of ram 17 includes an annular rib which may for instance extend full circle around compression face 18 a short distance inwardly of its peripheral edge. This rib may be of any desired cross section but is preferably arcuate. It may have any suitable depth consistent with the structural integrity of the peripheral edge of the element and which is suitable for producing the desired enhancement of apparent volumetric compression ratio. Representative depths would be those stated above for the central depression 132.

In this embodiment, the die cavity 2 may include the fillet 161 of FIG. 15 but preferably is like the die cavity of FIG. 14 having insert 121 and a step defined by surfaces 24 and 25. When this die cavity and the ram 17 of FIG. 16 are employed to produce an element following the general technique of FIGS. 1 through 5, the resultant element is shown in the central portion of FIG. 16. The annular rib 166 produces a corresponding annular groove 167 in the air infusion surface 130 of the element. The groove 167 may be positioned so that its shape intersects with or is slightly inward of the edge of the peripheral zone or the projected surface of vertical side surface 32. Thus, while annular groove 167 should be situated at least in part within the boundary zone of the element, it may project to some extent into the peripheral annular zone 29. An element having an annular groove 167 positioned as shown in FIG. 16 will include central, outward, boundary and annular peripheral zones delineated by reference lines 113A, 113B; 163A, 163B; 160A, 160B; and vertical cylindrical edges 30 in the same general manner as the element of FIG. 15.

Elements with boundary zones are illustrated by FIGS. 15 and 16 and have the advantage that their side surfaces 32 have an increased bubble release pressure. Thus they may suffer less or not at all from the disadvantages described above in respect to the FIGS. 6 and 14 embodiments. Thus, diffusion elements with central enhancement of apparent volumetric compression ratio, and with peripheral zones that have been rendered semi-permeable or substantially non-permeable can be improved, if desired, by enhancement of the apparent volumetric compression ratio in a boundary zone adjacent to and inwardly of the peripheral zone.

Figure 17:
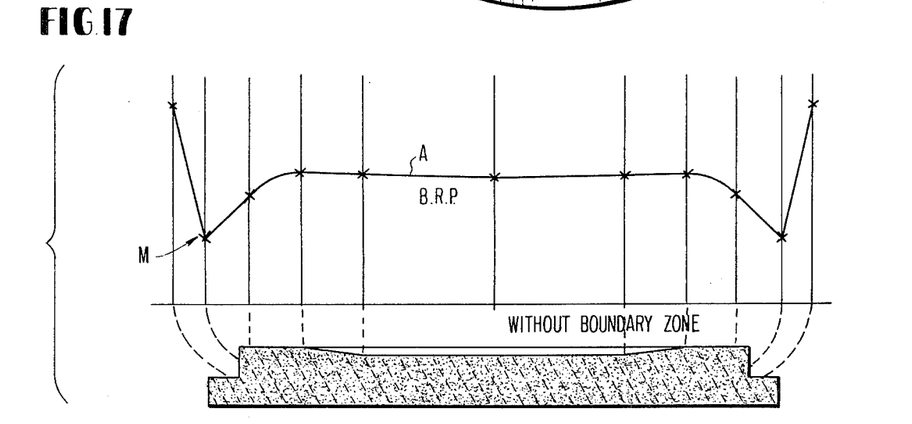
FIG. 17 is a transverse cross section of a diffusion element in accordance with FIG. 14 and an associated bubble release pressure plot exemplary of said element.
Figure 18:
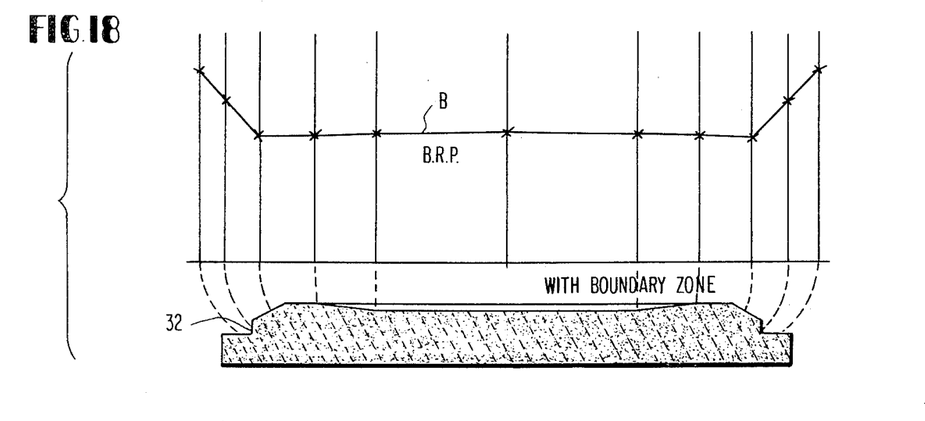
FIG. 18 is a transverse cross section of a diffusion element in accordance with FIG. 15 and an associated bubble release pressure plot exemplary of said element.

The benefits of providing a boundary zone are illustrated graphically in FIGS. 17 and 18, which show respectively the diffusion elements of FIGS. 14 and 15, without and with boundary zones, respectively. Using the bubble release pressure testing procedure of FIG. 7 and a form of graphical representation similar to that Figure, one may develop bubble release pressure (B.R.P.) curves A and B for the respective elements. Comparison of these curves shows that without the boundary zone there is a minimum M in the bubble release pressure curve at the element vertical side surface 32. When the boundary zone is provided, the bubble release pressure is increased in the area of surface 32 as shown by curve B in FIG. 18. In view of the inverse functional relationship of flow to bubble release pressure, the presence of the boundary zone enables one to control the flow from surface 32, making it more nearly equal to the flow through the center of the element.

Although the benefits of the boundary zone have been illustrated above by its effect upon a vertical surface, i.e. surface 32, the vertical surface is not required. The upper surface of the boundary zone may for example be a non-vertical surface, such as an outwardly and downwardly inclined surface extending all the way from the upper surface of the element to the upper surface of the peripheral zone.

In FIGS. 10 through 16 there have been shown diffusion elements in which reference lines such as 113A, 113B; 160A, 160B; 163A, 163B and so forth have been used to generally indicate the lateral bounds of various zones such as the central zone, outward zone, boundary zone and peripheral zone. These reference lines have not been drawn to scale nor should they be taken to mean that there should be a clearly vertical line of demarcation between the respective zones in actual products according to the invention. In diffusion elements within the scope of the invention, it may not be possible to draw any line of division between zones where material of significantly greater and less density or compaction will be found immediately to either side of the division between two zones. Rather these bounds have been given to illustrate the lateral extent of a volume which, when compared as a whole with an adjacent volume, exhibits the desired difference in apparent volumetric compression ratio.

Now that the principle of the invention has been taught, it should be apparent that it is capable of general application without necessarily being limited to products with limited ranges of properties. However, to assist those skilled in the art in practicing some of the more preferred alternative forms of the invention, some representative and preferred parameters and properties of the diffusion elements are described below.

It is believed that many applications of the invention will involve elements wherein the apparent volumetric compression ratio of the central zone has been enhanced, relative to the outward zone, by at least about 2%, more particularly about 2 to about 20% and preferably about 3 to about 15%. The foregoing percentages are obtained by expressing the difference in apparent volumetric compression ratios of the two zones as a percentage of the volumetric compression ratio of the outward zone. Similarly, most applications of the invention will involve enhancement of the apparent volumetric compression ratio of the boundary zone, relative to the outward zone, by at least about 10%, more particularly about 10 to about 35% and preferably about 35 to about 100%.

In principle, the invention is not limited to diffusion elements of a specific pore size, but many applications of the invention will involve diffusion elements in which the pore size is in the range of about 60 to about 600 microns, more particularly about 90 to about 400 microns and preferably about 120 to about 300 microns as computed in applying the bubble release pressure to the equation shown in ASTM E-128 $D = 30\ \gamma/p$, wherein $D$ = maximum pore diameter, $\gamma$ = surface tension of the test liquid in dynes/cm, and $p$ = pressure in mm of Mercury.

While the diffusion elements may include a wide variety of particulate (including fibrous) materials of both organic and inorganic character, they are clearly distinguishable from pressed, open, fibrous filters and the like in terms of modulus of compression, or specific permeability, or bubble release pressure, or a combination thereof. Thus, many applications of the invention will involve diffusion elements having a modulus in compression of at least about $0.2 \times 10^5$ psi, more particularly about $0.2 \times 10^5$ to about $4 \times 10^5$ psi in applications involving softer particulate materials, and preferably about $4 \times 10^5$ to about $6 \times 10^6$ psi when working with the harder inorganic materials. Generally, unused diffusion elements in accordance with the invention will have a specific permeability in the range of about 6 to about 200 SCFM, more particularly about 12 to about 70 SCFM and most preferably about 15 to about 35 SCFM in the case of alumina and silica sewage aeration diffusion elements. While most diffusion elements in accordance with the invention will have a bubble release pressure in the range of about 2 to about 20, and more particularly about 4 to about 15, the most preferred bubble release pressure for the preferred sewage aeration diffusion elements disclosed herein is about 5 to about 10.

For the most part the generally horizontal portions of the diffusion elements according to the invention will exhibit a ratio of maximum horizontal dimension relative to thickness of at least about 4 to 1, it being understood that non-circular shapes such as ovals and rectangles will have both maximum and minimum horizontal dimensions when viewed in plan view. Preferred and more preferred values for the aforesaid ratio are about 6 to 1 and about 8 to 1.

The invention is useful whenever it produces any functionally significant improvement in the uniformity of flow distribution across a diffusion element, and it would be virtually impossible to predict the minimum degree of improvement which might ever be considered functionally significant, given the potential for changes in the quality of instrumentation and technological need. However, certain classes of diffusion elements are illustrative of the type of benefits which can be produced by the invention. These include diffusion elements wherein the coefficient of variation of the gas discharge surface is not greater than about 0.25, based on the values of bubble release pressure measurements of at least five equally spaced points along each of two perpendicular reference lines extending across the surface of the element and through the center thereof. More preferred examples include diffusion elements, as just described, in which the coefficient of variation is in the range of about 0.05 to about 0.25 or more preferably less than about 0.05.

As previously disclosed the solid particles in the boundary zone of a diffusion element according to the inventon can be pressed to a greater apparent volumetric compression ratio as compared to the particles in the outward zone by forming the upper gas discharge surface above the boundary zone with a downward and outward slope at an angle of depression in a range of about 10 to about 80 degrees relative to the horizontal, with many applications of the invention falling in the range of about 20 to about 70 degrees and more preferably about 25 to about 65 degrees, with about 25 egrees being considered the optimum for the preferred sewage aeration elements being produced in accordance with the example which follows.

EXAMPLE

Figure 15A:
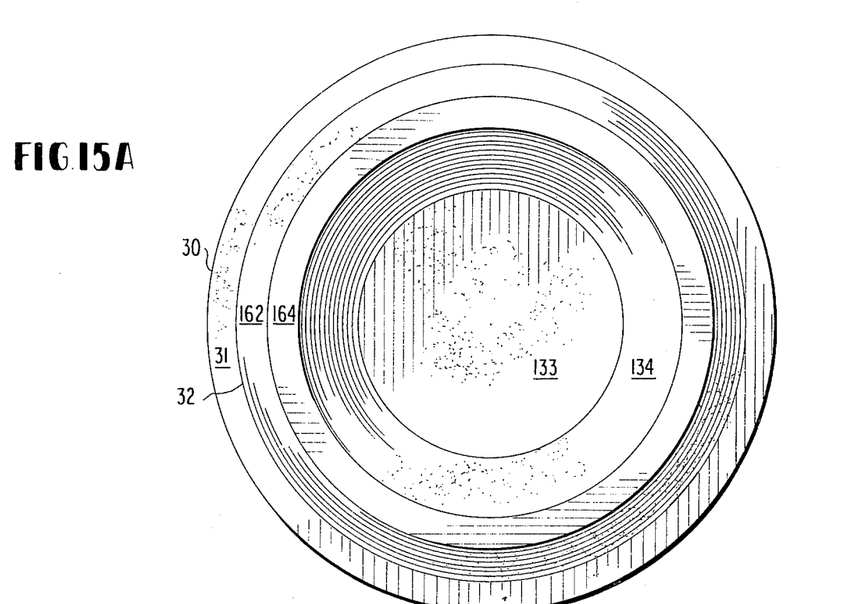
FIG. 15A is a plan view from the top, of the diffusion element of FIG. 15.

A diffusion element is fabricated in accordance with FIGS. 15 and 15A, which together illustrate the most preferred embodiment of the present invention. The respective outer diameters of flat area 133, beveled edge 134, flat surface 164, beveled surface 162 and horizontal annular surface 31 are 4.5, 6.5, 7.6, 8.7, and 9.25 inches, respectively. Surface 133 lies 0.070 inches below surface 164. Beveled surface 162 is at an angle of inclination α of 25° relative to the horizxontal and its common edge with vertical side surface 32 has a 1/16th radius as viewed in transverse cross section. 31, the top edge of vertical side surface 32 and horizontal flat surface 164 are 0.5, 0.741 and 1.000 inch respectively.

The plate is formed from a mix containing particles of alumina with mean transverse and longitudinal dimensions of 0.020 and 0.032 inch respectively, and 20 parts by weight of ceramic bonding agent, per hundred parts by weight of alumina particles. The mix is compacted in a press having a ram with a planar surface and a cylindrical die cavity with a shape corresponding to the illustration in FIG. 15, the height of the die from its bottom wall to its upper edge being 1.5 inches. The mix is struck off level with the top of the die as shown in FIG. 2 and is then compressed to the dimensions previously given under a pressure of approximately 900 psi. The resultant compact, after removal from the press, is fired in a kiln at a temperature sufficient to fuse the bonding agent and is then gradually cooled. The resultant product is a coherent porous ceramic diffusion element having a specific permeability of 25 SCFM ±3 SCFM, and a pore size of 165 μ.

The diffusion element produced according to the above illustrative example additional characteristics and properties which are optional but preferred features of the invention. The product of the example has a gas discharge surface which is free of bubble emitting macro openings such as those shown for instance in U.S. Pat. No. 3,970,731 to Oksmann. The element will emit bubbles from random locations throughout the gas discharge surface. The gas infusion surface of the element is free of air transmitting holes longer than 0.3T, wherein T is the average thickness of the element weighted on an area basis, or is free of such holes. Substantially all gas paths through the body of the element of its gas discharge surface, as installed in the plenum or other holder, are about the same length and substantially parallel. Moreover, it has a bubble release pressure of about 7 inches. The value of bubble pressure given is for bubble release release pressure in water of an element as manufactured, i.e. prior to use. The element is fabricated of hydrophilic material, i.e. materials which are hydrophilic in the element as manufactured and prior to use. Also, the element has a side surface, particularly vertical edge 32 in FIG. 15, which is at least semi-permeable and free of adherent material preventing bubble emission. The gas discharge surface will be free of through-holes other than pores. One may prepare duffusion elements having any one or all of the above preferred characteristics.

Based on the foregoing description, it should be apparent that the present invention may be embodied in a wide variety of forms, and that the invention is not limited to the precise embodiments disclosed in the foregoing description and drawings. Thus the appended claims should be construed to cover the subject matter described in said claims and all equivalents thereof.

What is claimed is:

1. A rigid, monolithic, porous, gas diffusion element said element being formed of a body of solid particles which has been shaped, pressed and rendered coherent by bonding or sintering in a compacted form having pores, said element including a generally horizontal portion having a specific permeability in the range of about 6 to about 200 SCFM per square foot of gas discharge surface per inch of thickness at 2 inches of water gauge, said generally horizontal portion, when viewed in vertical cross section while positioned with its maximum dimension extending horizontally, having a ratio of said maximum horizontal dimension relative to the thickness of said portion in the range of at least about 4 to 1, said generally horizontal portion including an upper gas discharge surface which is generally horizontal and has a bubble release pressure in water in the range of about 2 to about 20 inches of water, said element including central, outward and boundary zones beneath said gas discharge surface, said outward zone surrounding said central zone and said boundary zone surrounding said outward zone, said element including a peripheral zone surrounding said boundary zone and having a lesser permeability than a portion of said outward zone, or having therein solid particles which have been pressed to a greater density than the particles in a portion of said outward zone, or having a lesser height than a portion of said outward zone, the solid particles within said central zone having been pressed to a greater apparent volumetric compression ratio as compared to the particles in said outward zone, and the solid particles within said boundary zone having been pressed to a greater apparent volumetric compression ratio as compared to the particles in said outward zone.

2. A diffusion element according to claim 10 wherein the apparent volumetric compression ratio of said boundary zone has been enhanced by effecting, during pressing, relatively larger and smaller ratios of thickness reduction in said boundary zone and in the outward zone, respectively.

3. A diffusion element according to claim 2 wherein said larger and smaller percentages of thickness reduction have been effected by performing said pressing in a press having a ram and die cavity with spaced, opposed compression faces and wherein there are respectively smaller and larger clearances in those portions of the space between said faces which correspond to the positions of said boundary zone and outward zone in said diffusion element.

4. A diffusion element according to claim 3 wherein said smaller clearance is provided by a protuberance on the compression face of said die cavity.

5. A diffusion element according to claim 3 wherein said smaller clearance is provided by a protuberance on the compression face of said ram.

6. A diffusion element according to claim 1 wherein the apparent volumetric compression ratio of the central zone is at least about 2% greater than that of said outward zone.

7. A diffusion element according to claim 1 wherein the apparent volumetric compression ratio of the central zone is about 2 to about 20% greater than that of said outward zone.

8. A diffusion element according to claim 1 wherein the apparent volumetric compression ratio of the central zone is about 3 to about 15% greater than that of said outward zone.

9. A diffusion element according to claim 1 wherein the apparent volumetric compression ratio of said boundary zone is at least about 10% greater than that of said outward zone.

10. A diffusion element according to claim 1 wherein the apparent volumetric compression ratio of said boundary zone is about 10 to about 35% greater than that of said outward zone.

11. A diffusion element according to claim 1 wherein the apparent volumetric compression ratio of said boundary zone is about 35 to about 100% greater than that of said outward zone.

12. A diffusion element according to claim 1 having a bubble release pressure in the range of about 4 to about 15 inches of water.

13. A diffusion element according to claim 10 having a bubble release pressure in the range of about 5 to about 10 inches of water.

14. A diffusion element according to claim 1 having a pore size in the range of about 60 to about 600 microns as computed in applying the bubble release pressure to the equation $D=30\gamma/p$, wherein $D=$maximum pore diameter, $\gamma=$surface tension of the test liquid in dynes/cm, and $p=$pressure in mm of Mercury.

15. A diffusion element according to claim 1 having a pore size in the range of about 90 to about 400 microns, as computed in applying the bubble release pressure to the equation $D=30\gamma/p$, wherein $D=$maximum pore diameter, $\gamma=$surface tension of the test liquid in dynes/cm, and $p=$pressure in mm of Mercury.

16. A diffusion element according to claim 1 having an average pore size in the range of about 120 to about 300 microns, as computed in applying the bubble release pressure to the equation $D=30\gamma/p$, wherein $D=$maximum pore diameter, $\gamma=$surface tension of the test liquid in dynes/cm, and $p=$pressure in mm of Mercury.

17. A diffusion element according to claim 1 wherein said particles are of organic or inorganic material.

18. A diffusion element according to claim 17 wherein said particles include silica.

19. A diffusion element according to claim 17 wherein said particles include alumina.

20. A diffusion element according to claim 17 wherein said particles include synthetic resin.

21. A diffusion element according to claim 1 having a modulus in compression of at least about $0.2 \times 10^5$ psi.

22. A diffusion element according to claim 1 having a modulus in compression in the range of about $0.2 \times 10^5$ to about $4 \times 10^5$ psi.

23. A diffusion element according to claim 1 having a modulus in compression in the range of about $4 \times 10^5$ to about $6 \times 10^5$ psi.

24. A diffusion element according to claim 1 having a circular shape in plan view.

25. A diffusion element according to claim 1 wherein said generally horizontal portion, viewed in vertical cross section includes a lower gas infusion surface which is generally horizontal.

26. A diffusion element according to claim 25 wherein said lower gas infusion surface is generally parallel to said upper gas discharge surface.

27. A diffusion element according to claim 25 wherein said lower gas infusion surface is substantially planar.

28. A diffusion element according to claim 1 wherein the peripheral portion of the element, viewed in vertical cross section, includes generally upward and generally downward facing upper and lower surfaces.

29. A diffusion element according to claim 1 wherein substantially the entire upper surface of said element is generally horizontal.

30. A diffusion element according to claim 1 wherein substantially the entire lower surface of said element is generally horizontal.

31. A diffusion element according to claim 1 wherein substantially the entire upper and lower surfaces of said element are generally horizontal.

32. A diffusion element according to claim 1 wherein substantially the entire upper and lower surfaces of said element are parallel.

33. A diffusion element according to claim 1 wherein said upper gas discharge surface is planar.

34. A diffusion element according to claim 1 wherein upper gas discharge surface includes a depression above said central zone and spaced inwardly from the periphery of said element.

35. A diffusion element according to claim 34 wherein the outline of said depression is generally similar to that of the element as a whole.

36. A diffusion element according to claim 34 wherein the outline of said depression is generally circular.

37. A diffusion element according to claim 36 wherein the outline of said element is generally circular.

38. A diffusion element according to claim 34 wherein the area of said depression comprises about 10 to about 80% of the total area of said gas discharge surface.

39. A diffusion element according to claim 34 wherein the area of said depression comprises about 25 to about 75% of the total area of said gas discharge surface.

40. A diffusion element according to claim 34 wherein the area of said depression comprises about 45 to about 65% of the total area of said gas discharge surface.

41. A diffusion element according to claim 34 wherein the average depth of said depression relative to the thickness of said horizontal portion is in the range of about 2 to about 20%.

42. A diffusion element according to claim 34 wherein the average depth of said depression relative to the thickness of said horizontal portion is in the range of about 4 to about 15%.

43. A diffusion element according to claim 34 wherein the average depth of said depression relative to the thickness of said horizontal portion is in the range of about 5 to about 10%.

44. A diffusion element according to claim 34 wherein the area and average depth of said depression are sufficient for significantly enhancing the uniformity of gas distribution laterally across the horizontal gas discharge portion of said element.

45. A diffusion element according to claim 34 wherein the depth of said depression varies within the outline of said depression.

46. A diffusion element according to claim 45 wherein there is no depression within a portion of said outline.

47. A diffusion element according to claim 45 wherein said variation occurs gradually along gradually sloping portions of said upper gas discharge surface.

48. A diffusion element according to claim 1 wherein the solid particles have been pressed to a greater apparent volumetric compression ratio in the boundary zone as compared to the outward zone by forming the upper gas discharge surface above the boundary zone with a downward and outward slope at an angle in the range of about 10° to 70° relative to the surface of the outward zone.

49. A diffusion element according to claim 1 wherein the solid particles have been pressed to a greater apparent volumetric compression ratio in the boundary zone as compared to the outward zone by forming the upper gas discharge surface above the boundary zone with a downward and outward slope at an angle in the range of about 10° to about 80° relative to the horizontal.

50. A diffusion element according to claim 49 wherein said angle of depression is in the range of about 20° to about 70° relative to the horizontal.

51. A diffusion element according to claim 49 wherein said angle of depression is in the range of about 25° to about 65° relative to the horizontal.

52. A diffusion element according to claim 1 which is free of through-holes other than gas diffusion pores.

53. A diffusion element according to claim 1 having a specific permeability in the range of about 12 to about 70 SCFM.

54. A diffusion element according to claim 1 having a specific permeability in the range of about 15 to about 35 SCFM.

55. A diffusion element according to claim 1 wherein the ratio of the maximum horizontal dimension of the generally horizontal portion relative to the thickness of said portion is at least about 6 to 1.

56. A diffusion element according to claim 1 wherein the ratio of the maximum horizontal dimension of the generally horizontal portion relative to the thickness of said portion is at least about 8 to 1.

57. A diffusion element according to claim 1 wherein the coefficient of variation of the bubble release pressure of the gas discharge surface is not greater than about 0.25, based on the values of bubble release pressure measurements of at least 5 equally spaced points along each of the two perpendicular reference lines extending across said surface of the element and through the center thereof.

58. A diffusion element according to claim 57 wherein said coefficient is in the range of about 0.05 to about 0.25.

59. A diffusion element according to claim 57 wherein said coefficient is less than about 0.05.

60. A diffusion element according to claim 1 wherein the boundary zone is adjacent to said peripheral zone.

61. A diffusion element according to claim 60 wherein said apparent volumetric compression ratio has been enhanced in said boundary zone by effecting, during pressing, relatively larger and smaller ratios of thickness reduction in said boundary zone and in the outward zone, respectively.

62. A diffusion element according to claim 61 wherein said larger and smaller percentages of thickness reduction have been effected by performing said pressing in a press having a ram and die cavity with spaced, opposed compression faces and wherein there are respectively smaller and larger clearances in those portions of the space between said faces which correspond to the positions of said boundary zone and outward zone in said diffusion element.

63. A diffusion element according to claim 62 wherein said smaller clearance is provided by a protuberance on the compression face of said die cavity.

64. A diffusion element according to claim 62 wherein said smaller clearance is provided by a protuberance on the compression face of said ram.

65. A rigid, monolithic porous, gas diffusion element having the property of discharging gas in a substantially uniform manner throughout an upper gas discharge surface of said element, said element being formed of a body of solid particles which has been shaped, pressed and rendered coherent by bonding or sintering in a compacted form having pores, said element including a generally horizontal portion having a specific permeability in the range of about 6 to about 200 SCFM per square foot of gas discharge surface per inch of thickness at 2 inches of water gauge, said generally horizontal portion, when viewed in vertical cross section while positioned with its maximum dimension extending horizontally, having a ratio of said maximum horizontal dimension relative to the thickness of said portion in the range of at least about 4 to 1, said generally horizontal portion including said upper gas discharge surface, which has a bubble release pressure in water in the range of about 2 to about 20 inches of water, and a generally horizontal lower gas infusion surface, said element including central, outward and boundary zones beneath said gas discharge surface, said outward zone surrounding said central zone and said boundary zone surrounding said outward zone, said element including a peripheral zone surrounding said boundary zone and having a lesser permeability than a portion of said outward zone, or having therein solid particles which have been pressed to a greater density than the particles in a portion of said outward zone, or having a lesser height than a portion of said outward zone, the solid particles within said central zone having been pressed to a greater apparent volumetric compression ratio as compared to the particles in said outward zone, and the solid particles within said boundary zone having been pressed to a greater apparent volumetric compression ratio as compared to the particles in said outward zone, whereby said gas discharge surface has the property that its coefficient of variation is not greater than about 0.25, based on the values of bubble release pressure measurements of at least 5 equally spaced points along each of two perpendicular reference lines extending across said gas discharge surface and through the center thereof.

* * * * *

UNITED STATES PATENT AND TRADEMARK OFFICE
CERTIFICATE OF CORRECTION

PATENT NO. : 4,261,932

DATED : April 14, 1981

INVENTOR(S) : Lloyd Ewing and David T. Redmon and William H. Roche

It is certified that error appears in the above—identified patent and that said Letters Patent is hereby corrected as shown below:

Claim 2, line 1, change "10" to -- 1 --.

Signed and Sealed this

Thirtieth Day of March 1982

[SEAL]

Attest:

GERALD J. MOSSINGHOFF

Attesting Officer     Commissioner of Patents and Trademarks